Sept. 28, 1926.  A. H. ORCUTT  1,601,038

MEANS FOR USE IN EXAMINING THE CONTOUR OF GEAR WHEEL TEETH

Filed June 9, 1925    2 Sheets-Sheet 1

Inventor
A. H. Orcutt
By Marks Clerk
Attys.

Sept. 28, 1926.                                                        1,601,038
                          A. H. ORCUTT
      MEANS FOR USE IN EXAMINING THE CONTOUR OF GEAR WHEEL TEETH
                  Filed June 9, 1925      2 Sheets-Sheet 2

Inventor
A. H. Orcutt
By Marker&… Attys

Patented Sept. 28, 1926.

1,601,038

UNITED STATES PATENT OFFICE.

ARTHUR HITCHCOCK ORCUTT, OF BIRMINGHAM, ENGLAND, ASSIGNOR TO THE GEAR GRINDING COMPANY LIMITED, OF BIRMINGHAM, ENGLAND.

MEANS FOR USE IN EXAMINING THE CONTOUR OF GEAR-WHEEL TEETH.

Application filed June 9, 1925, Serial No. 36,008, and in Great Britain July 3, 1924.

The invention has for its object to provide improved means for use in examining the contour of gear wheel teeth and ascertaining more particularly whether or not the shape and disposition of the working surfaces of the teeth possess the required degree of accuracy.

The invention comprises a machine in which there are employed a pair of relatively movable parts, one of which depends for its motion upon a circular block corresponding to the pitch circle of the wheel, and the other receives its motion from the interaction of a standard piece corresponding to a rack tooth and one of the teeth on the wheel undergoing inspection, together with a device for indicating any relative movement between the said parts when the tooth is rotated through an appropriate angle.

In particular the invention comprises the combination of parts hereinafter described.

In the accompanying sheet of explanatory drawings:—

Figure 1:
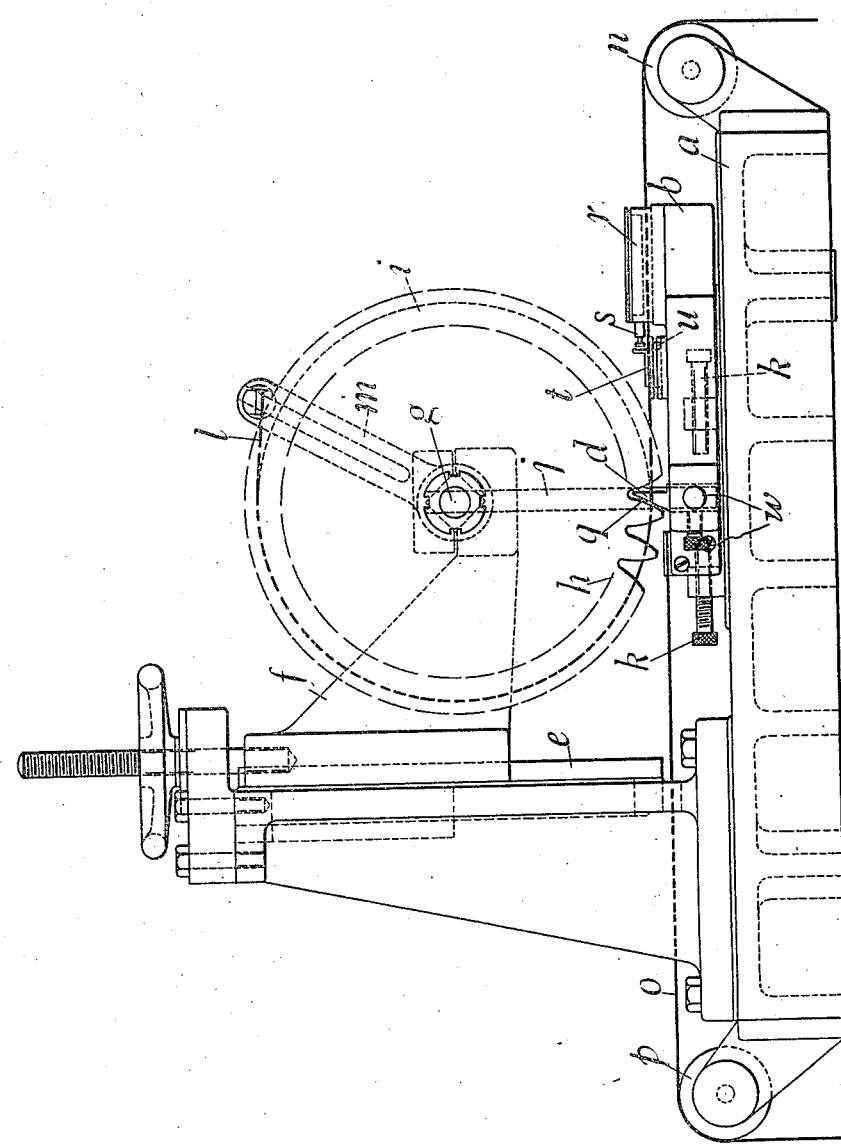
Figure 2:
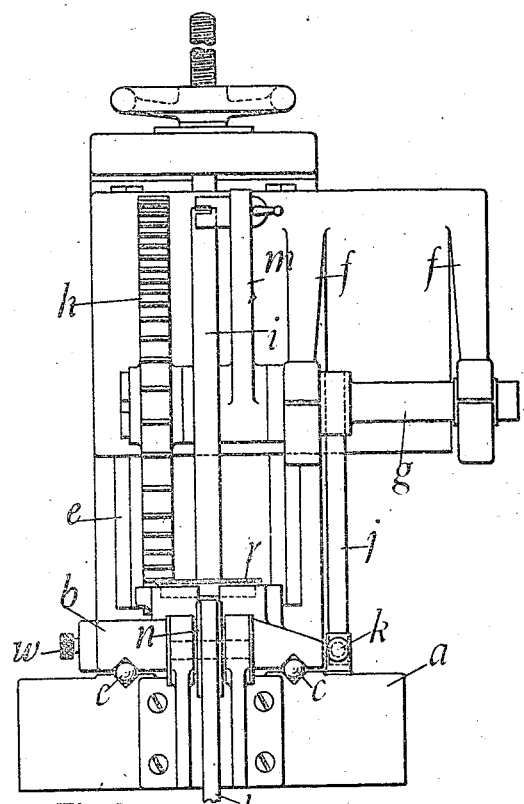
Figure 3:
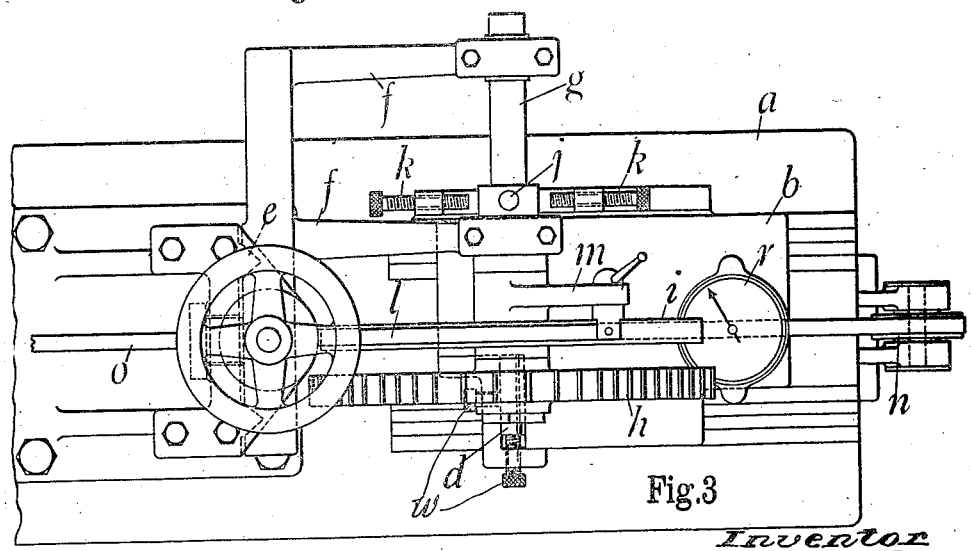

Figure 1 is a side elevation, Figure 2 an end elevation, and Figure 3 a plan of one form of apparatus constructed in accordance with this invention.

In carrying the invention into effect as shown, a horizontal bed $a$ has mounted on it a slide $b$ constructed to move accurately in a horizontal rectilinear path. The mounting of the slide on the bed is preferably effected through balls $c$ or rollers engaging grooves in both of the said parts. On the slide there is detachably secured by set screws $w$ a standard piece $d$ having a flat-inclined surface corresponding to one surface of a rack tooth, the inclination of the surface being equal to the pressure angle of the tooth of the gear being measured.

At one end of the bed there is arranged a vertical bracket $e$ on which is adjustably secured a bearing, or pair of bearings $f$ for carrying a horizontal spindle $g$ on which are coaxially secured the gear $h$ to be examined and a circular block $i$ corresponding in diameter to the pitch circle of the gear.

The spindle has secured to it a hand lever $j$ (movable between adjustable stops $k$,) whereby the tooth and pitch circle block can be rotated through a suitable angular distance. Around a portion of the circumference of the said block is wrapped a thin steel tape $l$ which is secured at one end to another lever $m$ on the spindle $g$, or to the block $i$ itself. The tape extends from the underside of the block along the upper side of the slide and around a guide pulley $n$, a weight (not shown) being attached to the overhanging end of the tape. Another tape $o$ is attached to the slide and arranged to pass in the opposite direction over another guide pulley $p$, its overhanging end also having attached to it a weight.

One side as $q$ of one of the teeth of the wheel abuts against the inclined surface of the standard piece $d$ above mentioned, and when movement is imparted by hand to the lever $m$, the interaction of the tooth and standard piece imparts a horizontal movement to the slide. At the same time the tape $l$ passing round the pitch-circle block also moves in the same direction. If the tooth surface is accurate as regards shape, or disposition, or both, no relative movement will occur between the tape and slide. But any inaccuracy will produce a relative movement. The movement is indicated by any suitable micrometer device. Preferably I mount on the upper surface of the slide a micrometer indicator $r$ of the dial type having a feeler $s$ projecting from one side, the feeler being arranged to bear against an abutment $t$ which is secured to the tape and supported by rollers $u$ on the slide.

Each tooth may be examined by bringing the teeth successively into co-operation with the standard piece on the slide and repeating the movement.

By this invention inaccuracy of tooth form or of disposition relatively to the pitch circle can be detected in a very convenient and expeditious manner.

The invention is particularly useful in the manufacture of high grade toothed wheels, especially those which in the final stage of manufacture are brought to the required form by accurate grinding operations.

Having thus described my invention what I claim as new and desire to secure by Letters Patent is:—

1. Means for use in examining the contour of gear teeth, said means including a rotatable circular block, means for mounting a gear wheel in a vertical plane coaxially with said block, a tape embracing part of the periphery of the block and extending horizontally from the underside thereof, a standard piece and a horizontal slide carrying the said piece for cooperating with the tooth face on a gear wheel, and means on the slide and tape for indicating relative horizontal movement of said parts.

2. In apparatus as claimed in claim 1, the provision on the slide of an indicator of the micrometer type and an abutment on the tape for coacting with a feeler on the indicator, and a roller or rollers on the slide for supporting the said abutment, substantially as described.

3. In apparatus as claimed in claim 1, the combination with the tape embracing the periphery of the circular block, of means for tensioning the tape, substantially as described.

4. In apparatus as claimed in claim 1, the combination with the slide, of a tape and means for tensioning the same, substantially as described.

5. In apparatus as claimed in claim 1, the combination of a lever and a pair of adjustable stops for limiting the angular movement of the rotatable circular block and gear wheel, substantially as described.

In testimony whereof I have signed my name to this specification.

ARTHUR HITCHCOCK ORCUTT.